United States Patent [19]

November

[11] 3,756,079

[45] Sept. 4, 1973

[54] TURBINE FLOWMETER

[75] Inventor: Milton H. November, Hacienda Heights, Calif.

[73] Assignee: International Telephone and Telegraph Corporation, New York, N.Y.

[22] Filed: Dec. 9, 1971

[21] Appl. No.: 206,470

Related U.S. Application Data

[63] Continuation-in-part of Ser. No. 13,926, Feb. 25, 1970, abandoned.

[52] U.S. Cl. ............................................. 73/231 R
[51] Int. Cl. ............................................. G01f 1/12
[58] Field of Search ................. 73/229, 230, 231 R; 415/115, 104, 105, 91

[56] References Cited
UNITED STATES PATENTS
3,388,595   6/1968   Last et al. ......................... 73/231 R FOREIGN PATENTS OR APPLICATIONS
190,444   9/1966   Japan .................................. 73/231

Primary Examiner—Jerry W. Myracle
Attorney—C. Cornell Remsen, Jr., Thomas E. Kristofferson et al.

[57] ABSTRACT

A turbine flowmeter having a passageway extending completely through its rotor or shaft. The rotor has an upstream diffuser on one side and a downstream diffuser on its other side. Accuracy and range are increased without an increased pressure drop. When the passageway is located through the rotor, accuracy over a linear range is increased further because fluid in the hole is angularly accelerated. This acceleration places a drag on the rotor which increases the meter linearity at low flow rates. Drag is decreased at high flow rates because the rotor moves close to the upstream diffuser and acts as a restriction on passageway flow. High flow rate accuracy is thus maintained.

13 Claims, 22 Drawing Figures

Patented Sept. 4, 1973

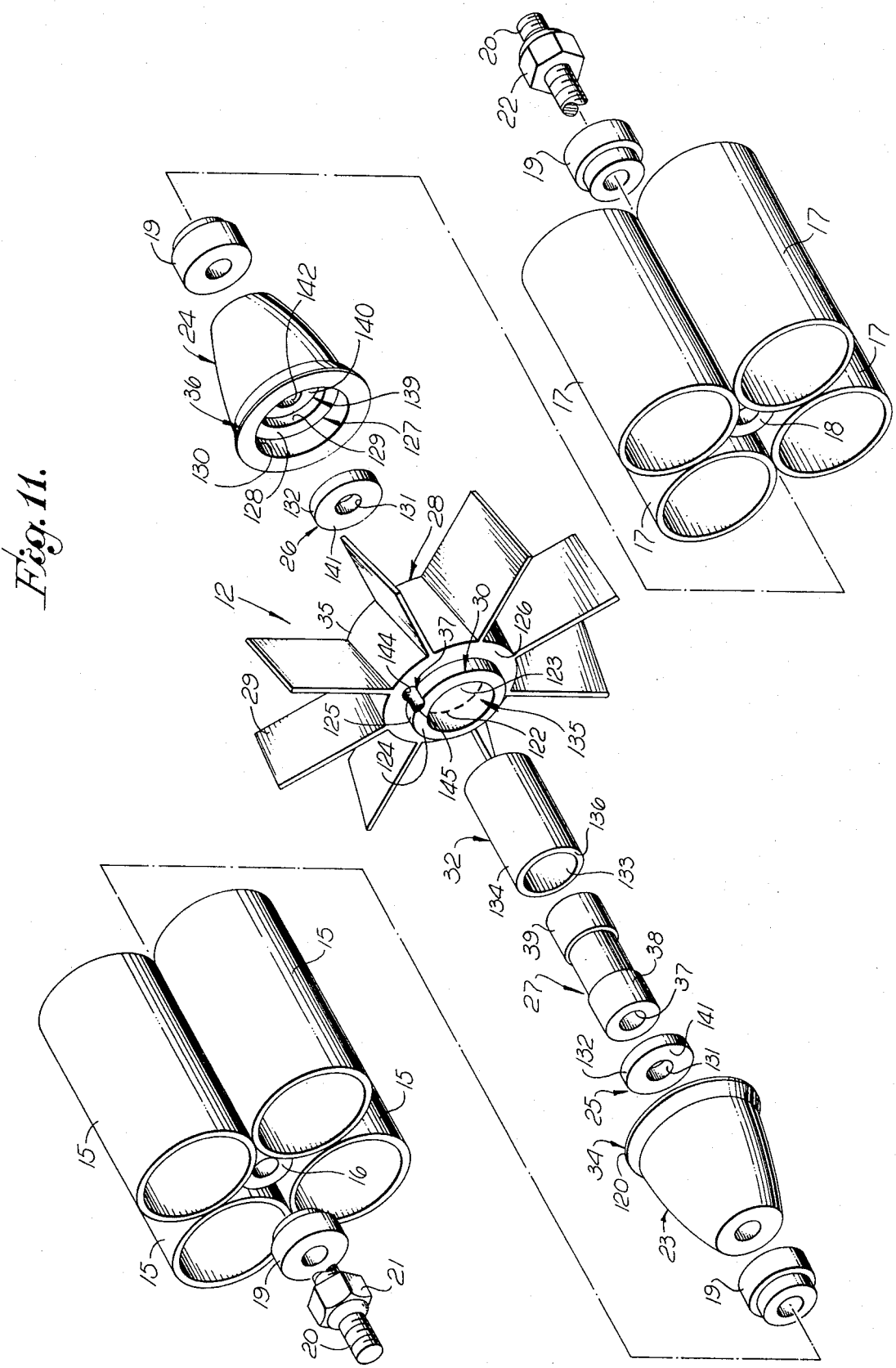

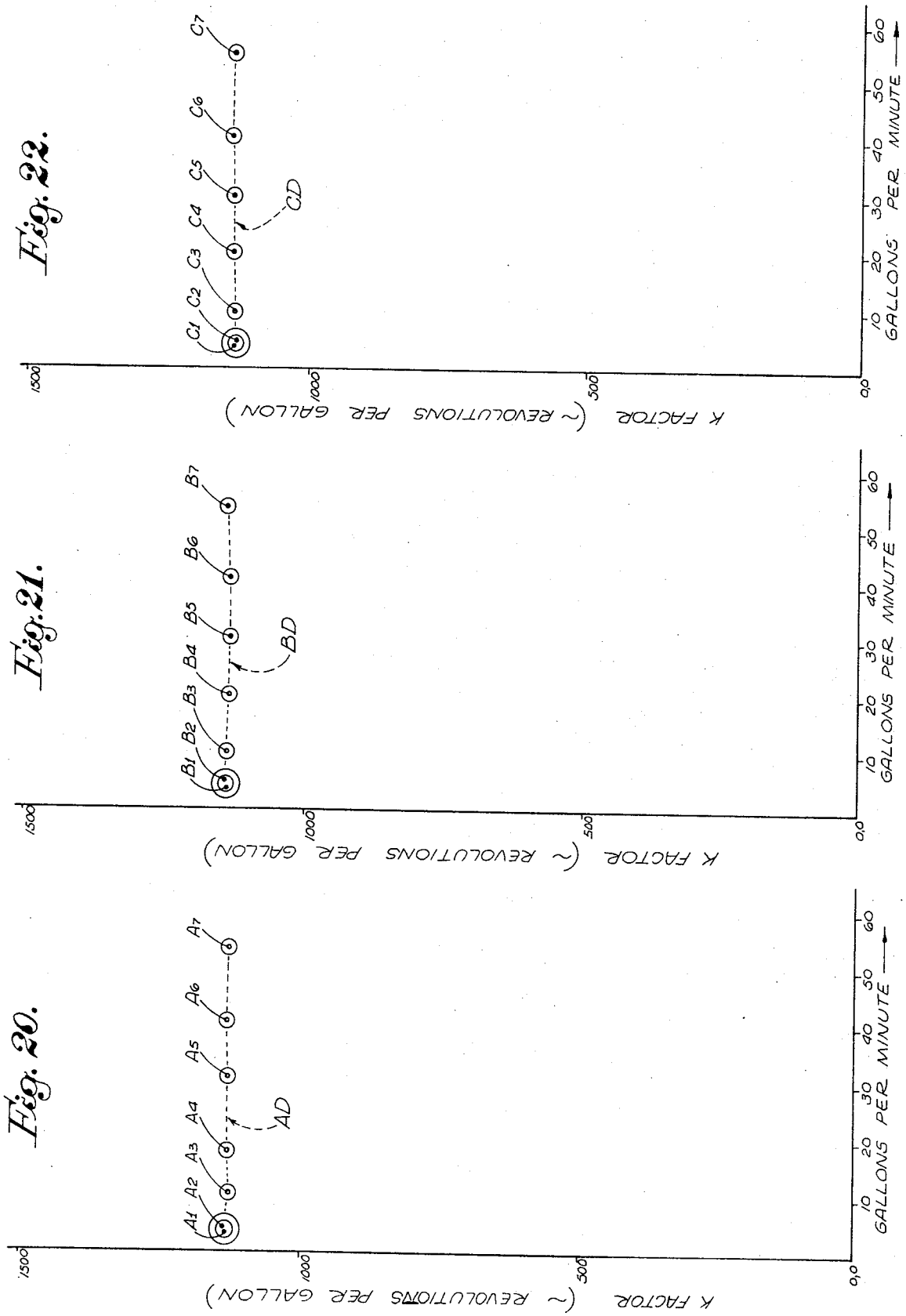

TURBINE FLOWMETER

This application is a continuation-in-part of copending application Ser. No. 13,926 filed Feb. 25, 1970 now abandoned, by Milton H. November for a TURBINE FLOWMETER. The benefit of the filing date of said application, therefore, is claimed for this application.

BACKGROUND OF THE INVENTION

This invention relates to devices for measuring the flow of fluids and, more particularly, to a turbine flowmeter having a high order of precision and a wide range of linear response at minimum pressure drops.

In the past, a positioning rotor has been employed in turbine flowmeters. In such devices, the rotor is rotatable on a shaft and slidable axially on the same shaft. By proper construction, the pressure on the upstream side of the rotor drops below that on the downstream side thereof. Thus, the rotor is suspended in a stationary position between two fluid thrust bearings at constant flow rates, and no thrust bearing friction loss is created. Since the thrust bearings are fluid, there is no wear and only small frictions losses. Such prior art meters are disclosed in U.S. Pat. Nos. 2,683,224; 2,709,366; 2,709,755; 3,091,964 and 3,238,776.

The above-described meters of the prior art, when working in a fluid having a viscosity of one centipoise, for example, exhibit a flow indication error plus or minus one-half percent over a range of 10:1 with a pressure drop of 8 to 20 psi. The error is substantial, the range is relatively small and the pressure drop is excessive. The error limitation is, of course, a limitation on the accuracy of the measurement of flow. The small range reduces the versatility of the instrument. The high pressure drop requires the use of excessive power to pump a fluid through the meter. The range can only be increased by over-driving the meter. This again causes the pressure drop to increase still further. Increased range, thus, can be achieved only by increasing the power to pump a fluid through the meter.

SUMMARY OF THE INVENTION

In accordance with the device of the present invention, the abovedescribed and other disadvantages of the prior art are overcome by providing a passageway through the turbine rotor or rotor shaft.

It is an outstanding advantage of the invention that when the passageway is in the rotating part of the rotor, accuracy over a linear range is increased still further because the fluid flowing therethrough is angularly accelerated. This acceleration puts a drag on the rotor which increases the meter linearity at low flow rates. Further, the drag is decreased at high flow rates because the rotor moves close to the upstream diffuser and acts as a restriction on passageway flow. High flow rate accuracy is, thus, maintained.

It is also an advantage of the invention that meter error is reduced to one-tenth percent over a range of 15:1 with a pressure drop of 4 psi for a fluid viscosity of, for example, one centipoise. Thus, prior art error is reduced by 80 percent, range is increased by 50 percent and, in spite of increasing range, pressure drop is reduced rather than increased, by a factor of 50 percent.

It is a further advantage of the invention that the meter thereof is a universal meter. It has little error when metering water or fluids having viscosities substantially higher or lower than that of water.

It is also an advantage of the invention that the rotor is made to position as before. Thus, thrust bearing friction is avoided. By the use of the present invention, the range of the instrument is also extraordinarily large. This is true because of the same restriction effect described previously. That is, the build up of rotor upstream pressure by the restriction prevents the rotor from touching the upstream diffuser.

The above-described and other advantages of the invention will be better understood from the following description when considered in connection with the accompanying drawings.

BRIEF DESCRIPTION OF THE DRAWINGS

In the drawings, which are to be regarded as merely illustrative:

FIG. 11 is an exploded perspective view of FIG. 1 without the housing;

FIGS. 20, 21 and 22 are graphs of performance curves of the embodiments of FIGS. 1, 15 and 16, respectively.

DESCRIPTION OF THE PREFERRED EMBODIMENTS

Figure 1:
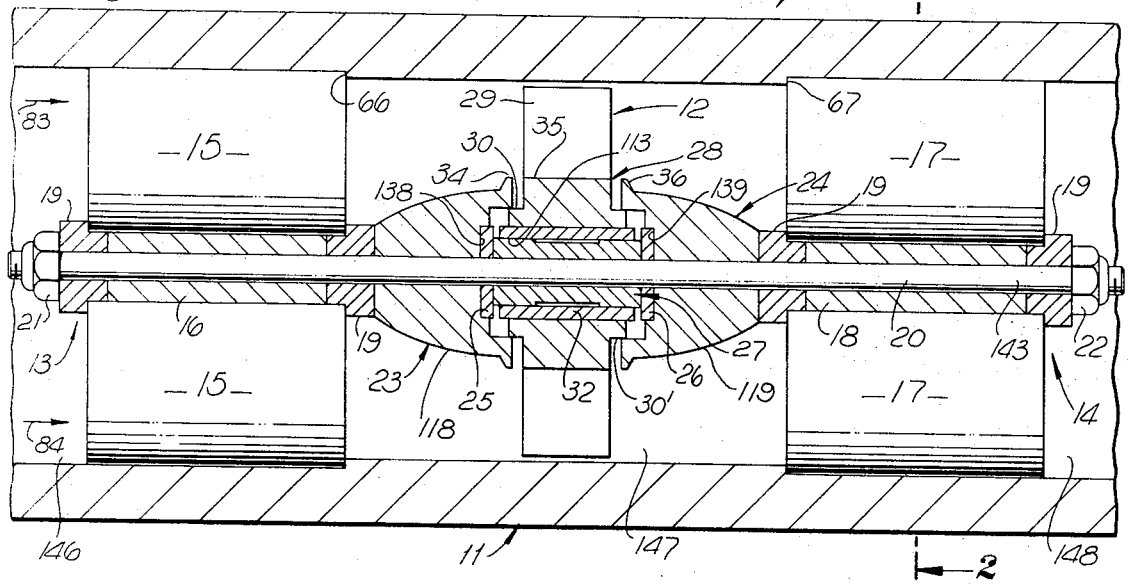
FIG. 1 is a longitudinal sectional view through a turbine meter.

A turbine meter 10 is shown in FIG. 1, including a nonmagnetic tube 11 in which a rotor 12 is supported by spiders 13 and 14.

Figure 2:
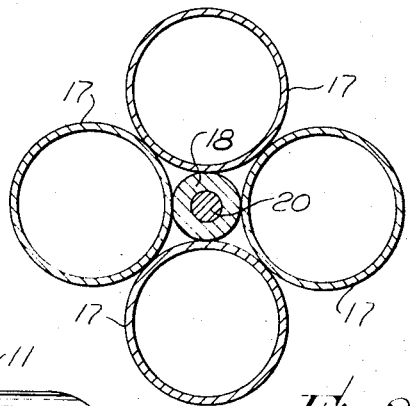
FIG. 2 is a transverse sectional view of a spider employed to support the meter rotor taken on the line 2—2 shown in FIG. 1.

Spiders 13 and 14 are identical. Spider 13 includes four cylinders 15 welded to each other and to a cylinder 16. Spider 14 similarly has four cylinders 17 welded to each other and to a cylinder 18. Cylinders 17 and 18 are shown in FIG. 2.

Cylinders 15 and 17 are made of spring metal so as to fit snugly inside tube 11.

Washers 19 are located at opposite ends of spiders 13 and 14. A shaft 20 extends through the entire assembly from a nut 21 threaded thereto to a nut 22 also threaded thereto. Nuts 21 and 22 are tightened so as to place shaft 20 always in tension. An upstream diffuser 23 is pressed to a downstream diffuser 24 between the metal washers 19. Diffuser 23 carries a seat 25, and diffuser 24 carries a seat 26. Diffusers 23 and 24 are held apart by a cylinder 27. Cylinder 27 is maintained in axial compression by the seats 25 and 26 and is thereby held in a fixed position on shaft 20. That is, cylinder 27 can neither move axially along shaft 20 nor rotate around it. Rotor 12 is made, but need not necessarily be made, of a substantially solid piece of metal except as described hereinafter. Rotor 12 includes a hub 28 having turbine blades 29 fixed thereto. Hub 28 has a cylindrical projection 30 which is a boss that is slidable in cylindrical recess 127 in diffuser 23. Optionally, a solid cylinder 32 is press fit or otherwise fixed inside hub 28 to act as a bearing with fixed cylinder 27.

Diffuser 23 has a lip 34 which extends above the periphery of hub 28 at 35. Downstream diffuser 24 has a lip 36 identical to lip 34 although it need not always be identical.

Note will be taken that the flowmeter of the invention does have, but need not necessarily have, substantially perfect symmetry about and along the axis of shaft 20.

Figure 3:
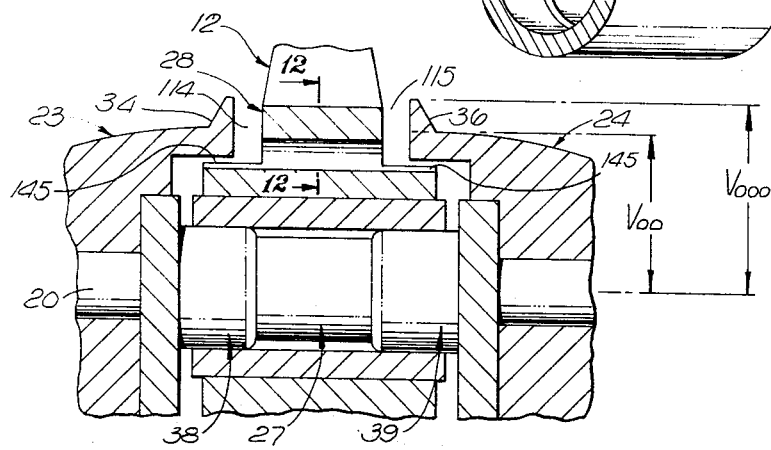
FIG. 3 is an enlarged sectional view of the rotor.

Note will be taken that in FIG. 3, cylinder 27 has end portions 38 and 39 of a diameter larger than the intermediate portion therebetween.

In the operation of the flowmeter 10, means are provided to detect the passage of each blade 29 past one or more positions around usually the outside of tube 11. Entirely conventional means may be employed for this purpose. For example, if blades 29 are made of a ferromagnetic material, a completely conventional magnetic pickup may be employed. In this case, the rate of generation of pulses will be proportional to the velocity of the fluid passing through tube 11 of the volume rate of fluid flow therethrough.

OPERATION

In the operation of the meter 10, lip 34 causes the pressure locally therearound on the left side of hub 28 to drop below that on the right side thereof. This is true because the pressure in a plane transverse to the axis of shaft 20 in the position of lip 34 is not uniform. It is lower near lip 34 and higher at a greater radius from the axis of shaft 20. Lip 34 causes a rapid increase of the velocity of the fluid flow in a localized volume therearound from left to right as viewed in FIG. 1. By the time the fluid reaches the right side of hub 28, the pressure in a similar localized volume around lip 36 has increased over the said pressure in the localized area around lip 34. However, lip 36 increases this pressure still further. At zero flow rates and flow rates close thereto, the rotor 12 will move to its far right position even though the pressure on the upstream side of hub 28 is less than that on the right side thereof. This is true because there will be insufficient differential pressure across hub 28 to move rotor 12 toward center. As the flow increases, the pressure difference will increase and rotor 12 will move to the left while the flow is increasing to the right. If hole 37 were not provided, hub 28 or cylinder 32 would contact the right end of diffuser 23 and cause the meter to malfunction. However, the hole 37 allows the increased pressure on the right or downstream side of hub 28 to pass therethrough and prevent hub 28 or cylinder 32 from touching diffuser 23 or seat 25. Note will be taken that the rotational movement of rotor 12 may be very great in comparison to the axial movement of rotor 12 or cylinder 27. Axial movement of rotor 12 on cylinder 27 takes place only when the rate of fluid flow changes.

Increased linearity is achieved at low flow rates because water flowing upstream through hole 37 must be angularly accelerated. This causes a retarding torque to be imposed on the rotor. However, continued accuracy at high flow rates is maintained because as hub 28 approaches diffuser 23, the flow through hole 37 is more restricted. The restriction is created because hub 28 moves very close to diffuser 23. The fluid cannot then easily flow out of hole 37 and then out of the space between hub 28 and diffuser 23. Then, there is less fluid to angularly accelerate per unit time. The rate of flow through hole 37 is reduced because of the restriction.

The rotor retarding torque effect is significant at low flow rates and insignificant at high flow rates.

It is also an advantage of the present invention that rotor 12 or hub 28 does not contact either diffuser 23 or diffuser 24. Effective fluid thrust bearings are relied upon for flow thrust bearing friction.

It is also a feature of the invention that cylinder 30 lies contiguous to the surrounding cup 31 of diffuser 23. Thus, as rotor 12 moves to the left, the flow of fluid between diffuser 23 and cylinder 30 is further restricted and proportional to the movement of rotor 12 toward diffuser 23.

Although the operation of meter 10 has been described as fluid flowing from left to right in FIG. 1, the substantially perfect symmetry of meter 10 makes it possible for the meter to be used for measuring fluid flow from right to left, as viewed in FIG. 1.

Hole 37 may be used by itself, if desired. Specifically, only one hole 37 is provided. More holes 37 may be provided, if desired.

FIRST ALTERNATIVE EMBODIMENT

Figure 4:
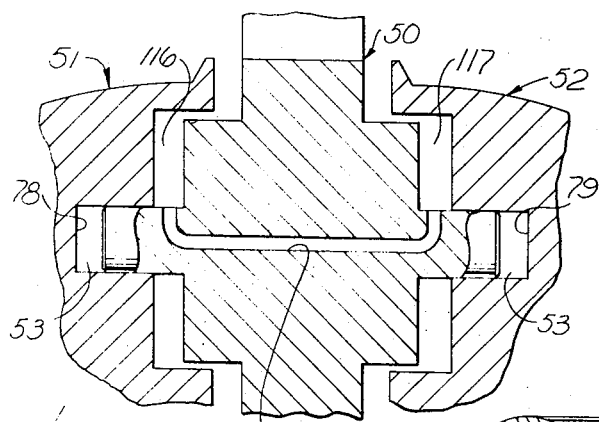
FIG. 4 is a longitudinal sectional view of an alternative embodiment of the invention.

In FIG. 4, a rotor 50 is rotatable in diffusers 51 and 52. Rotor 50 has a shaft 53 integral therewith. A passageway 54 is provided in shaft 53 which serves the same purpose as hole 37. Note that shaft 53 is integral with rotor 50. Alternatively, it may be fixed to diffusers 51 and 52 as well as the remainder of the assembly. If shaft 53 is fixed, it still may have passageway 54 therethrough, but provides no restrictive torque.

ADVANTAGES

As stated previously, the device of the present invention has a smaller error over a larger linear range than prior art flowmeters. The present invention also suffers a smaller pressure drop than prior art meters. It is also an advantage of the invention that it is a universal meter for fluids having wide ranges of viscosities.

The manner in which these advantages are achieved is explained in the following.

Figure 5:
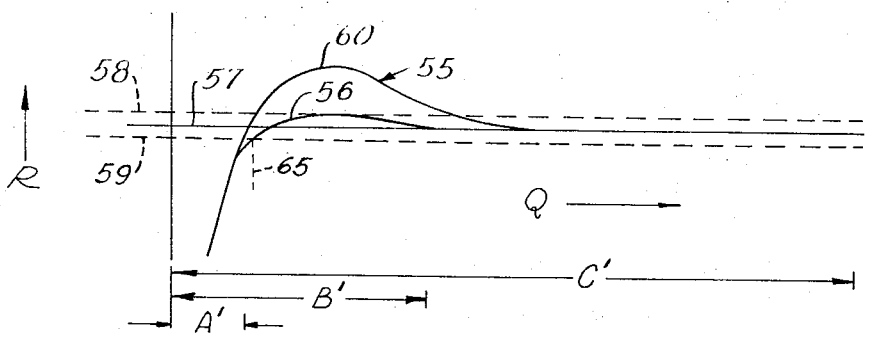
FIG. 5 is a graph of flowmeter performance characteristics.

In FIG. 5, a prior art flowmeter characteristic curve is indicated at 55. Another flowmeter characteristic curve is indicated at 56. Curve 56 is the curve of the meter of the present invention. The ordinate, R, is revolutions per unit volume. The abscissa, Q, is the flow rate in volume per unit time, e.g., gallons per minute. A horizontal straight line 57 is shown. Ideally, this should be the curve for every flowmeter. This curve indicates there is absolutely no flowmeter error in measurement. However, note will be taken that R for both curves 55 and 56 does not lie upon line 57.

Lines 58 and 59 represent maximum error.

Note that curves 55 and 56 may be nearly the same except over a certain range of Q somewhat larger than B'.

Note that curve 55 has a bulge 60 outside the desired tolerances of error. This bulge is caused by a phenomenon which may be explained by a curve 61, shown in FIG. 6.

Figure 6:
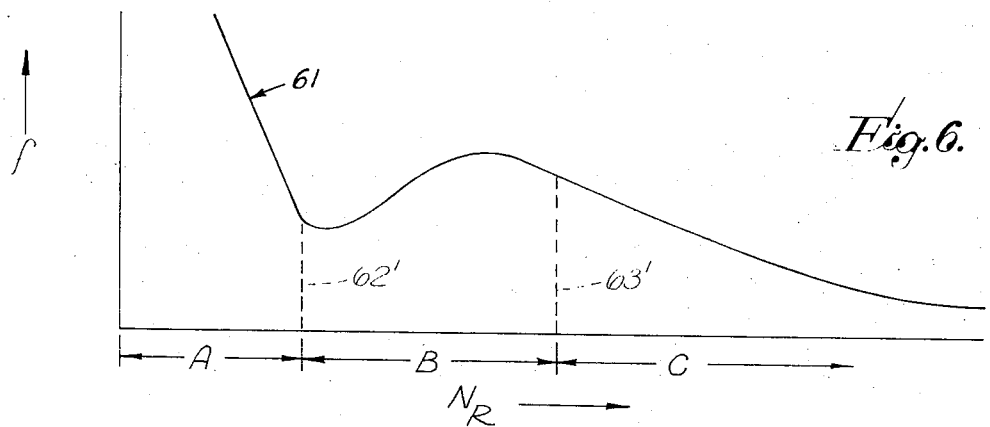
FIG. 6 is a graph of the friction factor versus Reynolds number.

In FIG. 6, $f$ is the friction factor, and $N_R$ is the Reynolds number. Curve 61 has a region A which represents laminar flow, a region B which represents transitional flow, and a region C which represented turbulent flow. Regions A, B and C are formed by dividing the positive abscissa by lines 62' and 63'.

$$N_R = (eVD/\mu)$$

where,
  $e$ = density,
  $V$ = velocity,
  $D$ = pipe diameter, and
  $\mu$ = viscosity.

For a given fluid and pipe $e$, $D$ and $\mu$ are constant. Thus, $N_R$ increases with $V$. The increase in $V$, thus, causes f to decrease in region A because when $V$ increases, so does $N_R$.

The drag, $F$, on the flowmeter rotor is given by $$F = K_D L/D (eV^2/2g)$$

where, $L/D$ is length to diameter ratio or its equivalent
  $K_D$ is a function of $f$, and
  $g$ is acceleration due to gravity.

Thus, $K_D$ decreases as f declines and $V$ and $N_R$ increase in region A. The decreased drag causes increased rotor speed to the bulge 60 on curve 55. The bulge 60 is caused by the shift in the center of pressure on the blade such that R, in regions A and B, decreases in $$\tan \alpha/R = \omega/V$$

where,
  $\alpha$ is the blade angle,
  R is the center of pressure on the blade, and
  $\omega$ is the angular velocity of the turbine. This condition is related to the velocity profile defect/$N_R$ phenomenon. Regions A', B' and C' in FIG. 5 correspond to regions A, B and C, respectively, in FIG. 6.

As stated previously, fluid passing through hole 37 is angularly accelerated. This places a drag on rotor 28. The drag produces rotor speed to curve 56 in FIG. 5. No reduction in speed occurs at high values of Q on curve 56 because rotor 28 moves close to diffuser 23 when it rotates at high speed and the main flow is from left to right in FIG. 1. Fluid in hole 37, then, cannot easily flow radially outwardly in between rotor 28 and diffuser 23 because of the constriction provided. That is, the constriction which is created by rotor 28 moving close to diffuser 23.

Figure 7:
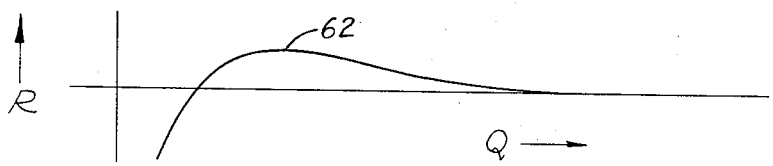
FIGS. 7, 8 and 9 are graphs of prior art flowmeter performance characteristics.
Figure 8:
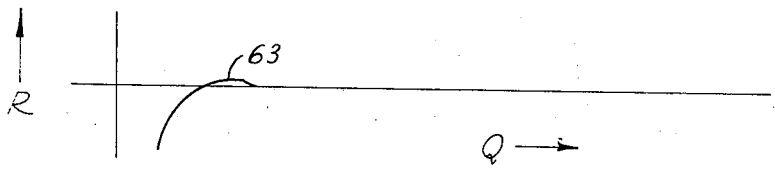
Figure 9:
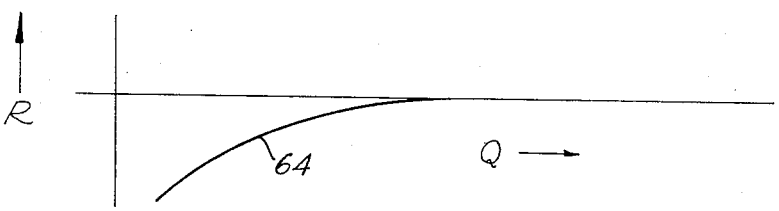

In FIGS. 7, 8 and 9, curves 62, 63 and 64 are shown, respectively. Curve 62 is the same type of curve as curve 55 for water. Curve 63 is a curve of a fluid having a viscosity less than water and density also less than water. Curve 64 is a curve of a fluid having a viscosity much greater than water and a density less than water.

Note that the meter of FIG. 1 is substantially a universal meter. That is, it may be employed to meter fluids having viscosities varying over a wide range. This is due to the fact that many fluids of viscosities different from water have densities less than water. Thus, as these fluids flow through hole 37, rotor 12 is not subjected to as much drag due to acceleration of the fluid. There is a reduced mass flow rate.

A further compensating factor is that at very high viscosities, flow through hole 37 will be slower, and the mass flow rate through the hole 37 will be lower. Thus, drag will be less.

Both factors—low density and high viscosity—make the device of the present invention unusually useful over a wide range of viscosities. The invention will cause the bulge at the low speed end of curve 62 to droop to a more accurate level. However, it will not cause curves 63 or 64 to droop.

Note will be taken that the flowmeter of the present invention has a smaller error over a larger linear range because curve 56 in FIG. 5 makes the entire meter characteristic from a point 65 fall between lines 58 and 59.

It is an outstanding feature of the invention that the meter range is increased at low flow rates. For example, if the range of curve 55 is approximately $$C'/B' = 12:7 = 1.7:1,$$

then the range of curve 56 is about $$C'/A' = 17:2 = 8.5:1.$$

Note that an improvement at low flow rates causes a vast increase in the linear range. If the range is initially 10:1, a five percent increase in range at the low end will result in a range ratio of 20:1.

In the past, increased range was obtainable only with an increase in pressure drop. That is, by overriding the meter at the high end. The device of the present invention requires no increase in pressure drop because range is increased at low flow rates. This is an advantage because an increased pressure drop requires more power and energy to pump the fluid through the meter.

Any one of the feature of the invention may be used with or without one or more of the other features.

Rotor 12 may be dynamically balanced, if desired.

Regarding cylinders 15 and 17, three cylinders 15 and 17 may be used in lieu of four or more.

Lips 34 and 36 may have the same diameter, if desired. Further, at least one of the lips 34 and 36 may have a maximum diameter larger than or equal to or less than that of hub 28. The other lip must always have a maximum diameter greater than the outside diameter of hub 28.

Figure 10:
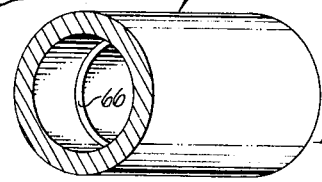
FIG. 10 is a perspective view, partly in section, of a tubular housing shown in FIG. 1.

In FIG. 10, tube 11 is shown in perspective. Note will be taken out both in FIG. 1 and in FIG. 10, tube 11 has internal shoulders 66 and 67 against which cylinders 15 and 17, respectively, abut. Preferably, cylinders 15 and 17 do not lie in pressure contact with shoulders 66 and 67. Thus, in tightening nuts 21 and 22, cylinders 15 and 17 will not first touch shoulders 66 and 67, respectively, before the other structures inside tube 11 become rigid. What is meant by becoming rigid is that eventually parts 19, 16, 23, 25, 27, 26, 24 and 18 will become relatively rigid when held in compression by tightening nuts 21 and 22.

Figure 12:
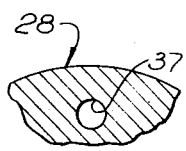
FIG. 12 is a transverse sectional view of a portion of the rotor taken on the line 12—12 shown in FIG. 3.

In FIG. 12, only an outer portion of hub 28 is shown without blades 29 in order to clearly demonstrate the relative size and location of hole 37.

Figure 13:
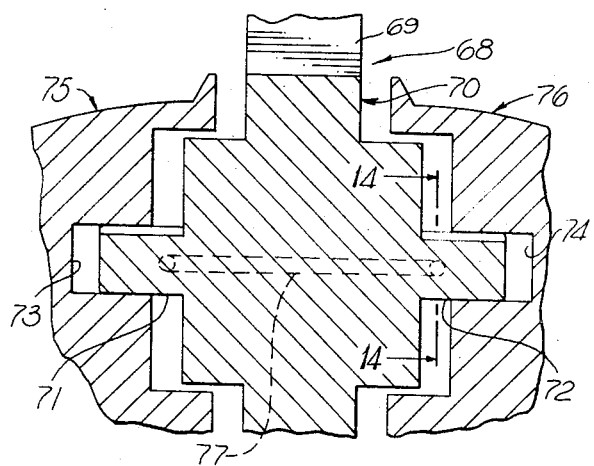
FIG. 13 is a longitudinal sectional view through another alternative embodiment of the present invention.

An alternative embodiment of the invention is shown in FIG. 13 including a flowmeter rotor 68 having blades 69 and a hub 70. Hub 70 has stub shafts 71 and 72 which are rotatable in cylindrical holes 73 and 74, respectively, in diffusers 75 and 76, respectively. The embodiment of FIG. 13 may be identical to the embodiment of FIG. 4 including a passageway 77, with two exceptions. The first exception is that even though the ends of stub shafts 53, shown in FIG. 4, are not shown shorter than cylindrical recesses 78 and 79 in diffusers 51 and 52, respectively, some tolerance is required although not shown. The same is true about the outside diameters of stub shafts 53 and the inside diameters of recesses 78 and 79.

Figure 14:
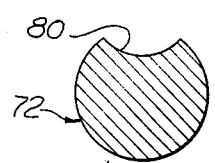
FIG. 14 is a transverse sectional view of a stub shaft taken on the line 14—14 shown in FIG. 13.

In FIG. 13, each stub shaft 71 and 72 is identical, and has a cross section with a scalloped-shaped recess 80 therein, as shown in FIG. 14.

Figure 15:
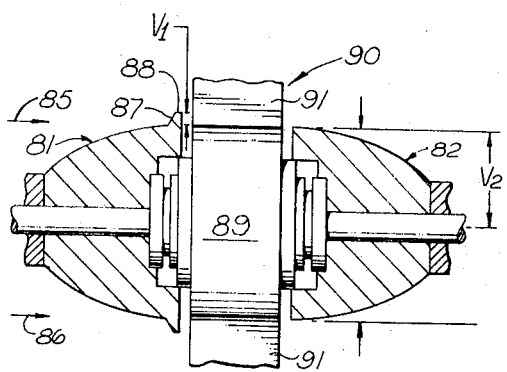
FIGS. 15, 16, 17, 18 and 19 are broken away longitudinal sectional views, partly in elevation, of alternative embodiments of the present invention.

Another alternative embodiment of the invention is shown in FIG. 15. The embodiment of FIG. 15 may be identical to that of FIG. 1 except for diffusers 81 and 82. Diffuser 81 may also be identical to diffuser 23. As before, fluid flow is considered to be to the right as indicated by arrows 83 and 84 in FIG. 1, and by arrows 85 and 86 in FIG. 15.

As will be indicated in the following, there is nothing stated hereinbefore that the lip 36 on diffuser 24 in FIG. 1 need be employed. Moreover, there is nothing stated herein to indicate that the maximum outside diameter of diffuser 24 must be greater than the maximum outside diameter of hub 28. Not only is there a complete absence of any such two statements herein, it is to be understood that there is nothing hereinbefore or hereinafter that should be interpreted to limit this invention to a downstream diffuser of a maximum diameter which is greater than, equal to or less than the outside diameter of hub 28.

In FIG. 15, it will be noted that diffuser 81 has a lip 87 with an outer circular edge 88. The radius of the outer circular edge, $r_1$, thus is greater than the radius, $r_2$, of a hub 89. Hub 89 is the hub of a rotor 90 having blades 91. Note in FIG. 15 also that the radius of hub 89 is exactly the same as the maximum diameter of diffuser 82. Moreover, diffuser 82 has no lip at all resembling lip 87.

Figure 16:
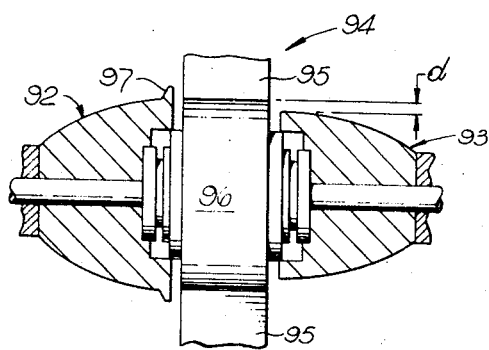

A further embodiment of the invention is shown in FIG. 16 including diffusers 92 and 93. Also shown is a rotor 94 having blades 95 and a hub 96.

The embodiment of FIG. 16 may be identical to the embodiment of FIG. 1 except for diffuser 93. For example, rotor 94 may be identical to rotor 12, and diffuser 92 may be identical to diffuser 23. Note will be taken that the radius of hub 96 is greater than the maximum radius of diffuser 93 by an amount, $d$. Further, note will be taken that again diffuser 92 has a lip 97, and that diffuser 93 has no lip remotely resembling lip 97. Again, in FIG. 16, fluid flow is assumed in the direction from left to right. The same is true in connection with FIGS. 17, 18 and 19.

Figure 17:
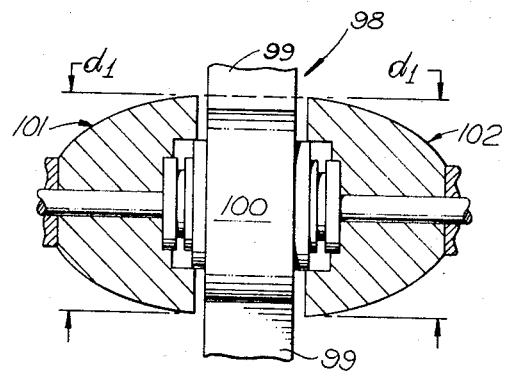

In FIG. 17, a still further embodiment is shown including a rotor 98 having blades 99 and a hub 100. A flowmeter also includes diffusers 101 and 102. The flowmeter of FIG. 17 may be identical to that shown in FIG. 1 with the exception of diffusers 101 and 102.

Neither of the diffusers 101 nor 102 have a lip in any way similar to lips 34 and 36 shown in FIG. 1. On the other hand, the maximum diameter of diffuser 101 is equal to that of diffuser 102. This is indicated at $d_1$. Further, $d_1$ is greater than the outside diameter of hub 100.

Figure 18:
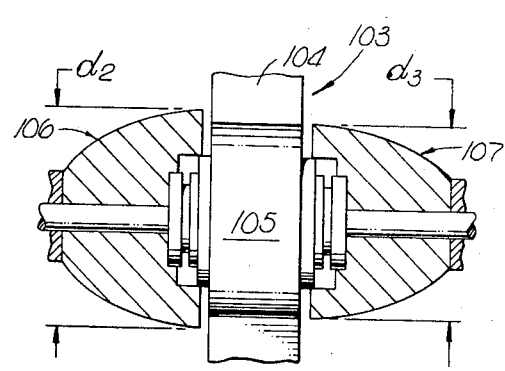

Still another alternative embodiment of the invention is illustrated in FIG. 18 including a rotor 103 having blades 104 and a hub 105. The embodiment of FIG. 18 also includes a diffuser 106, and a diffuser 107. As in FIG. 17, neither of the diffusers 106 and 107 of FIG. 18 has a lip in any way resembling lips 34 and 36 in FIG. 1. Except for diffusers 106 and 107, the embodiment of FIG. 18 may be identical to that shown in FIG. 1. Diffuser 106 has a maximum diameter, $d_2$, which is greater than both the outside diameter of hub 105, and the maximum diameter, $d_3$, of diffuser 107. Note will be taken that $d_3$ is also equal to the outside diameter of hub 105.

Figure 19:
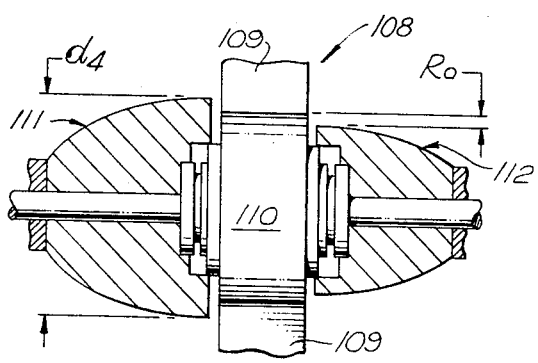

Still another embodiment of the invention is illustrated in FIG. 19 including a rotor 108 having blades 109 and a hub 110. The embodiment of FIG. 19 also includes a diffuser 111 and a diffuser 112. Again, neither of the diffusers 111 and 112 have a lip in any way resembling either lip 34 or lip 36, shown in FIG. 1. Diffuser 111 has a maximum outside diameter, $d_4$, which is larger than the outside diameter of hub 110. The outside radius of hub 110 is larger than the radius of diffuser 112 by an amount, $r_o$, shown in FIG. 19.

Although in many embodiments of the invention shown herein, the downstream diffuser is shown to have a maximum diameter equal to or less than that of the upstream diffuser, this is by no means critical and not a limitation on the invention. Specifically, the maximum outside diameter of the downstream diffuser may be greater than that of the upstream diffuser. Some improvement in floating rotor action can be anticipated on this account, at least in some cases.

FIGS. 20, 21 and 22 are graphs of performance characteristics of the embodiments shown in FIGS. 1, 15 and 16, respectively. In FIG. 20, points A1, A2, A3, A4, A5, A6 and A7 are plotted. In FIG. 21, points B1, B2, B3, B4, B5, B6, and B7 are plotted. In FIG. 22, points C1, C2, C3, C4, C5, C6 and C7 are plotted.

A line AO joins points A. A line BO joins points B. A line CO joins points C. Note will be taken that lines AO, BO and CO are all extremely precisely horizontal lines. This means that the turbine means of FIG. 1, 15 and 16 produce outputs which are all extremely accurate. In other words, the proportional factor K does not change substantially over the entire range of the flowmeters of FIGS. 1, 15 and 16. The number of revolutions or gallons is very, very close to the same at three gallons per minute as it is at 50 gallons per minute or more. The points, A, B and C are given in the following table.

| Point | Gallons per minute | K Factor |
| --- | --- | --- |
| A1 | 3.66 | 1133.00 |
| A2 | 4.92 | 1133.25 |
| A3 | 10.25 | 1130.00 |
| A4 | 17.74 | 1129.58 |
| A5 | 30.44 | 1130.08 |
| A6 | 39.98 | 1131.75 |
| A7 | 53.57 | 1131.33 |
| B1 | 3.64 | 1132.58 |
| B2 | 4.92 | 1131.58 |
| B3 | 10.08 | 1129.83 |
| B4 | 20.18 | 1132.50 |
| B5 | 29.99 | 1132.08 |
| B6 | 39.89 | 1132.00 |
| B7 | 53.90 | 1133.50 |
| C1 | 3.69 | 1133.41 |
| C2 | 4.93 | 1134.25 |
| C3 | 10.09 | 1130.66 |
| C4 | 20.10 | 1130.91 |
| C5 | 30.11 | 1132.33 |
| C6 | 40.22 | 1138.08 |
| C7 | 53.33 | 1137.83 |

DEFINITIONS

Tube 11 has a number of parts located internally thereof, as shown in FIG. 1. Tube 11 may thus be described as a housing.

Rotor 12 is a true rotor. Rotor 12 may thus be described as rotor means including any one or more of the parts 29, 28, 30 and 32. If desired, bearing 32 may be press fit through the internal cylindrical bore 123 of hub 28 to the position shown in FIG. 1. The word "rotor" is defined in *Webster's Seventh New Collegiate Dictionary* (G. & C. Merriam Company, Springfield, Massachusetts, U.S.A., 1916). This definition is as follows: "A part that revolves in a stationary part."

The word "floating" is hereby defined for use herein and in the claims as describing a turbine-type flowmeter rotor such as rotor 12, shown in FIGS. 1 and 3, wherein, in normal operation, no portion of the rotor touches the fixed structure except at the cylindrical bearing surface between cylinder 27 and bearing 32.

Note will be taken in FIG. 1, rotor blades 29, by themselves, may be entirely conventional. Blades 29 thus are fixed to hub 28 in a position extending radially outwardly from the flowmeter axis which lies perpendicular to the plane of the drawing of FIG. 2 at the center of the circular cross section of shaft 20.

The phrase "support means fixed relative to said housing inside thereof" is hereby defined in such a way that it may or may not include cylinder 27. Note will be taken that cylinder 27 is, in fact, fixed relative to tube 11 which acts as a housing, and that cylinder 27 is located inside housing or tube 11.

The phrase "said rotor means being mounted on said support means" is, therefore, deemed to be accurate because rotor 12, which also may be described as rotor means, is, in fact, mounted on support means which, as stated previously, may include cylinder 27.

The word "device" is hereby defined in such a way that it may or may not include lip 34 of diffuser 23, shown in FIG. 1, and its location, i.e., its maximum outside diameter being at a location which is spaced radially from the said axis of shaft 20 a distance further than the outside diameter of the cylindrical surface 35 of hub 28.

Lip or device 24 is mounted in tube or housing 11 to reduce the pressure of fluid adjacent the upstream side of rotor or rotor means 12 below that on the downstream side thereof. The left side of rotor 12, as viewed in FIG. 1, may or may not be the upstream side, and the right hand side of rotor 12 may or may not be the downstream side thereof.

The phrase "at least one of said means having a passageway extending completely therethrough" is hereby defined in such a way that it may or may not include either hole 37 in rotor 12, shown in FIG. 3, or passageway 77 in rotor 68, shown in FIG. 13. The word "passageway" is, therefore, hereby defined so that it may or may not include either hole 37 or passageway 77. Fluid in spaces 114 and 115 on both sides of rotor 12, respectively, in FIG. 3, lie in communication with each other through hole 37. Similarly, passageway 77 extends completely through rotor 68 in communication with fluid on both sides thereof at 116 and 117. The said communication for both FIG. 3 and FIG. 13, therefore, permits fluid flow through each corresponding passageway 37 and 77 from one side of the corresponding rotor to the other side thereof. In each case, passageways 37 and 77 are large enough to relieve at least some of the pressure differential across the corresponding rotors in a manner to keep the rotors in different stationary axial positions as they rotate for different corresponding constant flow rates within a predetermined flow rate range.

Cylinder or support means 27 has cylindrical bearing surfaces 38 and 39, shown in FIG. 3, which are concentric with the axis of shaft 20. Rotor or rotor means 12 is spaced from and out of all contact with all structures therearound including tube 11, shaft 20, thrust bearings 25 and 26, and diffusers 23 and 24 except the bearing surfaces 38 and 39 of the cylinder or support means 27 when the rotor or rotor means 12 is in each of the said stationary axial positions. The rotor or rotor means 12 is spaced from and completely out of contact with the lip or device 34 and housing or tube 11.

The phrase "support means" may or may not include, besides cylinder 27, both of the diffusers 23 and 24, shown in FIG. 1.

Diffusers 23 and 24 may be identical. However, it is to be understood that the present invention is by no means limited to such a construction. However, if desired, diffusers 23 and 24 may have external surfaces 118 and 119, respectively, which can be identical, if desired. Surfaces 118 and 119 are surfaces of revolution about a common axis, which axis is the axis of shaft 20.

Diffusers 23 and 24 are located on opposite sides of rotor or rotor means 12. Surfaces 118 and 119 increase in diameter in corresponding opposite directions toward the rotor or rotor means 12. Diffuser 23 has a lip 34 fixed thereto in a position adjacent rotor or rotor means 12 extending radially outwardly from the axis of shaft 20. Diffuser 24 has a lip 36 fixed thereto in a position adjacent rotor or rotor means 12 on the opposite side thereof which extends radially outward from the said axis.

Both lips 34 and 36 terminate in circular edges 120 and 121, respectively, shown in FIG. 11. The word "diffuser" is hereby defined to include any diffuser disclosed herein and all other operable diffusers.

The word "diffuser" is defined herein as either including all of the diffuser including any lip disclosed herein including, but not limited to, lip 34 or as including only that portion of a diffuser excluding a lip thereon. For example, the word "diffuser" is hereby defined to include either that portion of diffuser 24 lying inside the radius, $r_{oo}$, or all of the diffuser, i.e. that lying within the radius, $r_{ooo}$, shown in FIG. 3.

An important construction shown in FIGS. 1 and 3 is that lips 34 and 36 have a maximum outside diameter, $2r_{ooo}$, which is greater than the outside diameter of the hub 28. Hub 28 may be described as having a cylindrical main hole therethrough. This main hole is indicated at 123 in FIG. 11. The surface 123 is concentric with the axis of shaft 20. Hub 28 has a cylinder boss around the said main hole on each side thereof at 30 and 30', shown in FIG. 1. Bosses 30 and 30' extend in opposite directions from hub 28. Both of the boss internal surfaces are identical, only one being shown in FIG. 11 at 122. Surfaces 122 are actually extensions of surface 123, shown in FIG. 11. That is, surfaces 122 and 123 are cylindrical, of the same diameter and form one continuous surface.

The bosses have parallel end surfaces at 124 as shown in FIG. 11. Surfaces 124 are in respective parallel planes perpendicular to the axis of shaft 20. The hub has the said cylindrical external surface 35. Surface 35 is concentric with the axis of shaft 20. The bosses have cylindrical external surfaces 125, shown in FIG. 11. The outside diameter of each of the surfaces 125 is the same as the diameter of the other. Both surfaces 125 are concentric with the axis of shaft 20. Hub 28 has flat annular end surfaces 126 as shown in FIG. 11. Surfaces 126 are in parallel planes perpendicular to the axis of shaft 20.

Surfaces 125 are of equal lengths from the corresponding hub surfaces 126. Each of the diffusers 23 and 24, shown in FIG. 1, have a recess therein. Both recesses are identical. Thus, only one such recess is indicated at 127 in FIG. 11. Recess 127 has a substantially flat end surface 128 in a plane perpendicular to the axis of shaft 20. Surface 128 surrounds an internal cylindrical surface 129 normal to surface 128 and concentric with the axis of shaft 20. Recess 127 has a cylindrical surface 130. The diameter of surface 130 is slightly larger than the diameter of boss surface 125 so that the respective bosses may move into and out of respective recesses 127 in diffusers 23 and 24 without touching the same. Recesses 127 are positioned adjacent opposite sides of hub 28, respectively. The recess end surfaces 128 are positioned adjacent opposite sides of hub 28, respectively. The recess end surfaces 128 are spaced apart an axial distance greater than the maximum axial width of hub 28 which may or may not include bearing 32.

Seats 25 and 26 may also be described as "thrust bearings." Bearings 25 and 26 thus have cylindrical internal and external surfaces 131 and 132, respectively. Surfaces 131 and 132 are concentric with the axis of shaft 20.

Cylinder 32 may be described as "a hollow radial bearing having cylindrical internal and external surfaces." The internal surface is indicated at 133 in FIG. 11. The external surface is indicated at 134 in FIG. 11. Surfaces, 133 and 134 are concentric with the axis of shaft 20. Bearing 32 has a length and is press fit into the central bore 135 of hub 28 shown in FIG. 11. It is press fit to a position such that an equal portion thereof projects beyond each end of each corresponding hub boss 30 and 30', as shown in FIG. 1. Bearing 32 has flat end surfaces 136 in parallel planes perpendicular to the axis of shaft 20.

Cylinder 27 may be described as a "hollow shaft." It has cylindrical external surfaces 38 and 39. It has a cylindrical internal surface 137. Surfaces 38, 39 and 137 are concentric with the axis of shaft 20. Cylinder 27 extends through the interior of bearing 32. Bearing 32 is rotatable about and slidable on cylinder surfaces 38 and 39.

Cavities 138 and 139 are provided in the recesses 127 of diffusers 23 and 24, respectively. Cavities 138 and 139 are counterbores in recesses 127, one of which is shown in FIG. 11. Cavity 139 has the cylindrical surface 129 which is concentric with the axis of shaft 20. Cavity 139 has a flat end surface 140 in a plane perpendicular to the axis of shaft 20. The inside diameter of each surface 129 is less than that of the corresponding surface 130.

Each of the thrust bearings 25 and 26 has flat and parallel end surfaces 141, as shown in FIG. 11. Surfaces 141 are in planes perpendicular to the axis of shaft 20. Cylinder 27 is longer than bearing 32.

The diffusers 23 and 24 have cylindrical bores 142, shown in FIG. 11. Bores 142 and the interior surfaces of bearings 25 and 26 all have approximately the same inside diameter.

The phrase "solid rod" may be employed to describe shaft 20. Shaft 20 has a cylindrical external surface 143, shown in FIG. 1. Surface 143 has a diameter adapted to be assembled by sliding the same through parts 19, 16, 23, 25, 27, 26, 24 and 18, as shown in FIG. 1. Shaft surface 143 thus is contiguous to the parts just enumerated and the internal surfaces of the thrust bearings and cylinder 27.

Surfaces 118 and 119 of diffusers 23 and 24, shown in FIG. 1, may be described as being surfaces of revolution about a common axis. If so, the surface 143 of shaft 20 is concentric with the common axis.

Nuts 21 and 22 and the threaded ends of shaft 20 may be referred to as "screw threaded means." These means are thus mounted on shaft 20 in a position holding diffusers 23 and 24 and thrust bearings 25 and 26 in compression against the opposite ends of cylinder 27.

Hole 37 in hub 28 may be described as "an auxiliary hole." Hole 37 extends completely through hub 28. The hole 37 is defined by a cylindrical surface 144. Surface 144 has an axis parallel to the axis of shaft 20, but this need not necessarily be true and the invention still practiced. Surface 144 is spaced from hub surfaces 123 and 35.

Each of the bosses 30 and 30' have concave surfaces 145, shown in FIGS. 3 and 11, therearound. Surfaces 145 are portions of a surface of revolution about the axis of hole 37. The radius of each of the surfaces 145 is equal to the radius of surface 144. The surfaces 125 on opposite sides of hub 28 intercept corresponding concave surfaces 145 in line edges lying in a plane which may be described as "a single first predetermined plane." Thus, a second predetermined plane tangent to surface 144 and parallel to the said first plane is spaced apart a radial distance from the first plane measured from the interceptions of a straight line segment with the first and second planes perpendicular thereto. The said radial distance is substantially larger than the difference between the diameter of hole 37 and the said radial distance. Diffusers 23 and 24 are spaced are spaced apart a minimum axial distance greater than the minimum axial width of hub 28.

Housing or tube 11 is generally cylindrical and has a fairly uniform cylindrical bore except for shoulders 66 and 67, as shown in FIG. 1. Tube 11 may thus be described as "hollow."

As shown in FIG. 1, tube 11 has surfaces at 146, 147 and 148. All of the surfaces 146, 147 and 148 are cylindrical and concentric with the axis of shaft 20. The diameter of surface 146 is equal to the diameter of surface 148. Because of shoulders 66 and 67, as shown, the diameter of surface 147 is somewhat less than the diameter of surfaces 146 and 148. The nominal internal bore of tube 11 may be referred to simply as the "bore." The inside diameter of housing 11 may be referred to as being of a bore diameter, D. The "nominal" or "bore" diameter, D, may be equal to the diameter of surfaces 146 and 148, the diameter of surface 147, or any diameter greater than that of surface 147 and less than that of surfaces 146 and 148. The bore of tube 11 may be referred to as having an "axis" which is identical with that of shaft 20.

The blades 29 of rotor 12, by themselves, may be entirely conventional, if desired. The same is true of the cylindrical shape of the external cylindrical surface 35 of hub 28. Note will be taken that blades 29 are fan-like blades. They are fixed to hub 28 in a position extending radially outwardly therefrom in a direction away from the axis of shaft 20.

The phrase "spider means" may include one of the sets of cylinders 15 or 17 with its corresponding cylinders 16 or 18. As just defined, the "spider means" may be any spider means. The said spinder means, as just described, may be any conventional spider means not remotely resembling that disclosed herein.

As is conventional for such spider means, it is desirable, insofar as it is possible, to support the turbine meter rotor and whatever other structures are to be supported with it, without considerably impeding fluid flow and without causing an undesirably high pressure drop across the turbine meter. Thus, for use with the present invention, any conventional spider means are contemplated which are fixed relative to tube 11 by any means including, but not limited to, nuts 21 and 22 and shoulders 66 and 67. Such spider means is thus fixed relative to tube 11 inside thereof. The spider means also has a maximum cross sectional area including all those cross hatched areas in FIG. 2 in a plane perpendicular to the axis of shaft 20 which is small in comparison to $(\pi D^2)/4$.

One or more of the support means defined hereinbefore may be employed and fixed to the said spider means inside the bore of tube 11. The rotor 12 is is then mounted on the support means or cylinder 27 and is rotatable relative thereto about the axis of shaft 20, which is also the internal bore axis of tube 11. Rotor 12 is also slidable back and forth in opposite directions over the axis of shaft 20, the sliding engagement of bearing 32 with cylinder 27 providing for such sliding action.

The phrase "flow control means" is hereby defined so that it may or may not include one or both of the diffusers 23 and 24. The phrase "flow control means" is also hereby defined, alternatively, to include one or more diffusers or other structures. Thus, a diffuser or flow control means is fixed relative to the support means or cylinder 27. The flow control means thus can include a diffuser fixed relative to the support means and spaced axially from the rotor on each side thereof.

Note will be taken that the flow control means is constructed and positioned to prevent fluid flowing axially inside the bore of tube 11 from reaching rotor 12 except by flowing over the external surface of one of the diffusers toward the rotor. In the example of FIG. 1, it first must flow over the upstream diffuser 23 if fluid flow is in the direction of arrows 83 and 84. It otherwise flows first over diffuser 24.

Note will be taken that, for example, lips 34 and 36 are actually projections on what otherwise is a fairly smooth curved or convex surface. Each lip disclosed herein is, therefore, hereby defined to include a projection, and vice versa.

Due to the fact that bearing 32 is more or less fixed relative to rotor 12, it may be considered as a part of hub 28. In such a case, bore 133 of bearing 32, shown in FIG. 11, may be considered to be a "bore" in the hub 28. Notwithstanding the foregoing, all of the embodiments of the invention may be bidirectional. That is, if desired, flow may be from right to left in all of FIGS. 1, 3, 4, 13, 15, 16, 17, 18 and 19. Thus, in some cases, only the downstream diffuser need have a diameter greater than that of the hub. In any case, however, at least one of the upstream and downstream diffusers must have a diameter greater than that of the hub. In FIGS. 1 and 15, for example, flow opposite arrows 83, 84, 85 and 86 establishes diffusers 23 and 81 as the downstream diffusers.

The axis of hole 37 need not necessarily be straight or open at the same radial or circumferential position on opposite sides of hub 28. For example, the axis of hole 37 also need not be uniform in size along its length.

One or more holes 37, 54 and 77 may be constructed and located for reasons of rotor balance.

What is claimed is:

1. A turbine flowmeter comprising: a housing; floating rotor means including a hub and a plurality of blades fixed thereto in a position extending radially outwardly therefrom; support means fixed relative to said housing inside thereof, said rotor means being mounted on said support means and being rotatable relative thereto and axially slidable relative thereto; and a device mounted in said housing to reduce the pressure of fluid adjacent the upstream side of said rotor means below that on the downstream side thereof, at least one of the said means having at least one passageway extending completely therethrough in communication with fluid on both of the sides of said rotor means to permit fluid to flow therethrough from one of said rotor means sides to the other, said passageway being large enough to relieve at least some of the pressure differential across said rotor means in a manner to keep said rotor means in different stationary axial positions as it rotates for different corresponding constant flow rates within a predetermined flow rate range, said support means having a cylindrical bearing surface concentric with said axis, said rotor means being spaced from and out of all contact with all solid structures therearound except said support means bearing surface when said rotor means is in each of said stationary axial positions, said rotor means being spaced from and completely out of contact with said device and said housing.

2. The invention as defined in claim 1, wherein said support means includes first and second cup-shaped diffusers each having substantially identical external surfaces of revolution about a common axis, said diffusers being located on opposite sides of said rotor means, both said diffuser external surfaces increasing in diameter in corresponding directions toward said rotor means, each diffuser having a lip fixed thereto in a position adjacent said rotor means extending radially outward, both of said lips having an outside diameter greater than that of said hub, aid hub having a cylindrical main hole therethrough concentric with said common axis, said hub having a cylindrical boss around said main hole on each side thereof extending in opposite directions therefrom, the internal surfaces of said bosses being an extension of said main hole surface, said bosses having parallel end surfaces in respective parallel planes perpendicular to said common axis, said hub having a cylindrical external surface concentric with said common axis, said bosses having cylindrical external surfaces of the same diameter and concentric with said common axis, said hub having flat, annular end surfaces in parallel planes perpendicular to said common axis, said boss external surfaces being of equal lengths from said hub annular end surfaces to said boss end surfaces, respectively, each of said diffusers having a recess therein with a substantially flat end surface in a plane perpendicular to said common axis and a surrounding internal cylindrical surface normal to said end surface thereof and concentric with said common axis, said recess cylindrical surfaces both being of the same diameter and being slightly larger than said boss external surfaces so that the respective bosses may move into and out of the respective recesses without touching the same, said recess being positioned adjacent opposite sides of said hub, respectively, said recess end surfaces being spaced apart an axial distance greater than the maximum axial width of said hub, a hollow radial bearing having cylindrical internal and external surfaces concentic with said common axis, said redial bearing having a length and being press fit into said hub main hole to a position such that an equal portion thereof projects beyond each end of each corresponding hub boss, said radial bearing have flat end surfaces in parallel planes perpendicular to said common axis, a hollow shaft having cylindrical internal and external surfaces concentric with said common axis, said shaft extending through the interior of said radial bearing, said radial bearing being rotatable about and slidable on the cylindrical external surface of said shaft, each flat surface of said diffuser recesses having a cavity therein, each cavity having a cylindrical surface concentric with said common axis and a flat end surface in a plane perpendicular to said common axis, the inside diameter of each cavity cylindrical surface being less than that of the corresponding recess cylindrical surface, a thrust bearing in each cavity having cylindrical internal and external surfaces concentric with said common axis, each of said thrust bearings having flat, parallel end surfaces in planes perpendicular to said common axis, said shaft being longer than said radial bearing, said diffusers having cylindrical bores, said bores and the internal surfaces of said thrust bearings and said shaft all having approximately the same inside diameter, a solid rod having a cylindrical external surface of a diameter to be adapted to be assembled by sliding the same said bores and the internal surfaces of said thrust bearings and said shaft, said rod surface being contiguous to said bores and the internal surfaces of said thrust bearings and said shaft, said rod external surface being concentric with said common axis, screw threaded means mounted on said rod in a position holding each said diffuser and each corresponding said thrust bearing in compression against each corresponding one of the two opposite ends of said shaft, said hub having an auxiliary hole extending completely therethrough defined by a cylindrical surface having an axis parallel to said common axis, said auxiliary hole surface being spaced from the internal and external cylindrical surfaces of said hub, each said boss having a concave surface around the exterior thereof, each said concave surface being a portion of a surface of revolution about said auxiliary hole axis of a radius equal to that of said auxiliary hole cylindrical surface, the external surfaces of said bosses intercepting said concave surface in line edges lying in a single first predetermined plane, a second predetermined plane tangent to said auxiliary hole cylindrical surface parallel to said first plane being spaced apart a radial distance from said first plane measured from the interceptions of a straight line segment with said first and second planes perpendicular thereto, said radial distance being substantially larger than the difference between said auxiliary hole diameter and said radial distance, said diffusers being spaced apart a minimum axial diatance greater than the minimum axial width of said hub.

3. The invention as defined in claim 1, wherein said support means includes first and second cup-shaped diffusers each having substantially identical external surfaces of revolution about a common axis, said diffusers being located on opposite sides of said rotor means, both said diffuser external sufaces inceasing in diameter in corresponding directions therefrom toward said rotor means, each diffuser having a lip fixed thereto in a position adjacent said rotor means extending radially outward, both of said lips having an outside diameter greater than that of said hub, said hub having a central portion defined within an external cylindrical surface having a predetermined axis of revolution, said central portion also being defined between parallel planes perpendicular to said axis, said hub having a boss fixed to each end thereof, each boss being defined between parallel planes perpendicular to said axis and a cylindrical surface of revolution about said axis, the outside diameter of said hub being greater than that of said bosses, both bosses having the same outside diameter and thickness, a stub shaft fixed to the end of each boss, each stub shaft being defined between parallel planes and a cylindrical external surface concentric with said axis, both stub shafts having the same length and diameter, each diffuser having a recess therein to surround each corresponding boss, each said recess being defined by a cylindrical surface concentric with said axis and a flat annular surface in a plane perpendicular thereto, each said recess having the same diameter and depth, said recess annular surfaces being spaced axially apart a distance greater than the perpendicular distance between the ends of said bosses, said lips being spaced apart a distance greater than the central portion of said hub, each said diffuser having an internal cylindrical bearing surface concentric with said axis, each stub shaft being journaled in each corresponding bearing surface and being rotatable therein and slidable axially therein, said diffuser cylindrical recess surfaces being spaced from but being located close to the corresponding cylindrical surfaces of said bosses, said passageway extending through said hub.

4. The invention as defined in claim 3, wherein said passageway also extends through each stub shaft, said passageway having an openlng at each end thereof into the space between said hub and a corresponding diffuser, each opening being located through the cylindrical surface of each corresponding stub shaft.

5. The invention as defined in claim 1, wherein said passageway extends through said rotor means hub, said rotor means having a cylindrical bore, said support means including cylindrical means in said rotor means bore, said passageway being located in said hub between said bore and the said cylindrical external surface of said hub, said passageway being of such a size and location that enough fluid flows therethrough to place a retarding torque on said rotor means selectively within a predetermined low flow rate range to linearize the angular velocity of said rotor means per unit volume of fluid passing through said housing, said retarding torque being a result of the angular acceleration of fluid in said passageway.

6. A turbine flowmeter comprising: a hollow housing having an approximately cylindrical internal bore of a diameter, D, said bore having an axis; floating rotor means including a hub and a plurality of fan-like blades fixed thereto in a position extending radially outwardly therefrom; spider means fixed relative to said housing inside thereof, said spider means having a maximum cross sectional area in a plane perpendicular to said axis small in comparison to $(\pi D^2)/4$ wherein $\pi = 3.1416$; support means fixed relative to said spider means inside said bore, said rotor means being mounted on said support means and being rotatable relative thereto about said axis and axially slidable thereover; flow control means fixed relative to said support means, said flow control means including a diffuser fixed relative to said support means spaced axially from said rotor means on each side thereof, each said diffuser having an external surface which is approximately a surface of revolution concentric with said axis, the diameter of each said diffuser external surface increasing in an axial direction toward said rotor means, said flow control means being constructed and positioned to prevent fluid flowing axially inside said bore from reaching said rotor means except by flowing over the external surface of one of said diffusers toward said rotor means, said hub having an approximately cylindrical external surface of a diameter less than that of the maximum outside diameter of said one diffuser to reduce the pressure of fluid adjacent one side of said rotor means immediately adjacent said one diffuser below that on the other side thereof, at least one of said means having at least one passageway extending completely therethrough in communication with fluid on both of said rotor means sides to permit fluid to flow therethrough from said other rotor means side to said one side thereof, said passageway being large enough to relieve at least some of the pressure differential across said rotor means in a manner to keep said rotor means in different stationary axial positions as it rotates for different corresponding constant flow rates within a predetermined flow rate range, said support means having a cylindrical bearing surface concentric with said axis, said rotor means being spaced from and out of all contact with all solid structures therearound except said support means bearing surface when said rotor means is in each of said stationary axial positions, said rotor means being spaced from and completely out of contact with both of said diffusers.

7. The invention as defined in claim 6, wherein said one diffuser includes a projection which extends radially outward from said axis at the end of said one diffuser immediately adjacent said rotor means, said lip extending to said one diffuser maximum outside diameter at an edge which is circular, concentric and symmetrical about said axis.

8. The invention as defined in claim 7, wherein said other diffuser includes a projection which extends radially outward from said axis at the end of said other diffuser immediately adjacent said rotor means, said lip extending to the maximum outside diameter of said other diffuser at an edge which is circular, concentric and symmetrical about said axis, the maximum diameter of said other diffuser being greater than the outside diameter of said hub.

9. The invention as defined in claim 8, wherein said passageway extends through said rotor means hub, said rotor means having a cylindrical bore, said support means including cylindrical means in said rotor means bore, said passageway being located in said hub between said bore and the said cylindrical external surface of said hub.

10. The invention as defined in claim 9, wherein both of said diffusers are substantially identical.

11. The invention as defined in claim 6, wherein said passageway extends through said rotor means hub, said rotor means having a cylindrical bore, said support means including cylindrical means in said rotor means bore, said passageway being located in said hub between said bore and the said cylindrical external surface of said hub.

12. The invention as defined in claim 11, wherein said passageway is of such a size and location that enough fluid flows therethrough to place a retarding torque on said rotor means selectively within a predetermined low flow rate range to linearize the angular velocity of said rotor means per unit volume of fluid passing through said housing, said retarding torque being a result of the angular acceleration of fluid in said passageway.

13. A turbine flowmeter comprising: a hollow housing having an approximately cylindrical internal bore of a diamter, D, said bore having an axis; floating rotor means including a hub and a plurality of fan-like blades fixed thereto in a position extending radially outwardly therefrom; spider means fixed relative to said housing inside thereof, said spider means having a maximum cross sectional area in a plane perpendicular to said axis small in comparison to $(\pi D^2)/4$ wherein $\pi = 3.1416$; support means fixed relative to said spider means inside said bore, said rotor means being mounted on said support means and being rotatable relative thereto about said axis and axially slidable thereover; flow control means fixed relative to said support means, said flow control means including a diffuser fixed relative to said support means spaced axially from said rotor means on each side thereof, each said diffuser having an external surface which is approximately a surface of revolution concentric with said axis, the diameter of each said diffuser external surface increasing in an axial direction toward said rotor means, said flow control means being constructed and positioned to prevent fluid flowing axially inside said bore from reaching said rotor means except by flowing over the external surface of one of said diffusers toward said rotor means, said hub having an approximately cylindrical external surface of a diameter less than that of the maximum outside diameter of the other diffuser to increase the pressure of fluid adjacent one side of said rotor means immediately adjacent said other diffuser above that on the other side thereof, at least one of said means having at least one passageway extending completely therethrough in communication with fluid on both of said rotor means sides to permit fluid to flow therethrough from said one rotor means side to said other side thereof, said passageway being large enough to relieve at least some of the pressure differential across said rotor means in a manner to keep said rotor means in different stationary axial positions as it rotates for different corresponding constant flow rates within a predetermined flow rate range, said support means having a cylindrical bearing surface concentric with said axis, said rotor means being spaced from and out of all contact with all solid structures therearound except said support means bearing surface when said rotor means is in each of said stationary axial positions, said rotor means being spaced from and completely out of contact with both of said diffusers. rotor means being spaced from and completely out of contact with both of said duffusers.

* * * * *